United States Patent
Zha

(10) Patent No.: US 10,988,619 B2
(45) Date of Patent: Apr. 27, 2021

(54) MANUFACTURING METHOD OF RHODAMINE DYE OLIGOMER, SOLID COLOR MATERIAL AND LIQUID CRYSTAL DISPLAY DEVICE

(71) Applicant: TCL CHINA STAR OPTOELECTRONICS TECHNOLOGY CO., LTD., Guangdong (CN)

(72) Inventor: Bao Zha, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/616,979

(22) PCT Filed: Nov. 13, 2019

(86) PCT No.: PCT/CN2019/117810
§ 371 (c)(1),
(2) Date: Nov. 26, 2019

(65) Prior Publication Data
US 2021/0017390 A1 Jan. 21, 2021

(51) Int. Cl.
*C09B 69/10* (2006.01)
*G02F 1/1335* (2006.01)
*C09B 11/24* (2006.01)

(52) U.S. Cl.
CPC ............ *C09B 69/103* (2013.01); *C09B 11/24* (2013.01); *G02F 1/133514* (2013.01); *G02F 2202/04* (2013.01)

(58) Field of Classification Search
CPC .. C09B 69/103; C09B 11/24; G02F 1/133514
See application file for complete search history.

(56) References Cited

U.S. PATENT DOCUMENTS

| | | | | |
|---|---|---|---|---|
| 2015/0010856 A1* | 1/2015 | Idei | ........................ | G02B 5/201 430/7 |
| 2015/0316687 A1* | 11/2015 | Park | ........................ | G03F 7/0007 252/586 |
| 2016/0004154 A1* | 1/2016 | Idei | ........................ | G03F 7/0048 359/885 |
| 2016/0146986 A1* | 5/2016 | Muro | ........................ | G03F 7/32 430/7 |
| 2016/0146987 A1* | 5/2016 | Ito | ........................ | C09B 69/109 430/7 |
| 2016/0327859 A1* | 11/2016 | Idei | ........................ | C09B 69/109 |
| 2017/0137628 A1* | 5/2017 | Szwarcman | ........ | G02F 1/133617 |
| 2017/0145216 A1* | 5/2017 | Suzuki | .................... | C09B 11/24 |
| 2019/0094688 A1* | 3/2019 | Itou | ........................ | C09B 57/10 |

FOREIGN PATENT DOCUMENTS

| | | | | | |
|---|---|---|---|---|---|
| CN | 104185815 A | * | 12/2014 | .......... | C09B 69/105 |
| CN | 108508700 | * | 9/2018 | | |
| CN | 109031775 | * | 12/2018 | | |
| CN | 109467955 | * | 3/2019 | | |
| CN | 109762363 | * | 5/2019 | | |
| CN | 110194901 | * | 9/2019 | | |
| CN | 110407970 | * | 11/2019 | | |
| KR | 101071281 B1 | * | 10/2011 | | |
| WO | WO-2015016243 A1 | * | 2/2015 | ............. | G02B 5/205 |

OTHER PUBLICATIONS

Barber; Adv. Mater. 2018, 30, 1706118. (Year: 2018).*
Beija; Chem. Soc. Rev., 2009, 38, 2410-2433. (Year: 2009).*
Broer; e-Polymers 2001, 1, 023. (Year: 2001).*
Chen; Crystals 2019, 9, 364. (Year: 2019).*
Haack; Tetrahedron Letters 2017, 58, 1733-1737. (Year: 2017).*
Chinese Patent Office; First Office Action in Application CN201910655745.4, dated Mar. 4, 2020, 5 pages (English Translation). (Year: 2020).*

* cited by examiner

*Primary Examiner* — Daniel R Carcanague
(74) *Attorney, Agent, or Firm* — Mark M. Friedman

(57) ABSTRACT

A manufacturing method of a rhodamine dye oligomer, a solid color material, and a liquid crystal display device are provided. By oligomerization of rhodamine dyes, monodispersion of rhodamine dyes can be achieved, preventing the enhanced shoulder peak caused by aggregation of rhodamine dye molecules, Meanwhile, the purification of color gamut is achieved, and the thermal stability of rhodamine dyes is increased, thereby meeting the need of liquid crystal display devices. Moreover, applying the rhodamine dye oligomer to the solid color material and fabricating the solid color film for application in the liquid crystal display devices can prevent a great loss of brightness of display devices.

11 Claims, 1 Drawing Sheet

MANUFACTURING METHOD OF RHODAMINE DYE OLIGOMER, SOLID COLOR MATERIAL AND LIQUID CRYSTAL DISPLAY DEVICE

FIELD OF INVENTION

The present disclosure relates to the field of display technologies, and more particularly, to a manufacturing method of a rhodamine dye oligomer, a solid color material, and a liquid crystal display device.

BACKGROUND OF INVENTION

The development process of display technologies is embodied by the ability to reproduce color. From the first generation of the universal color standard (standard Red Green Blue, sRGB) to the film color gamut (DCI), and even to the next generation of television display standards (BT.2020), the color gamut has been improving. High color gamut means that a TV can display more plentiful colors and have stronger color display ability that can effectively prevent distortion or color block during display. Due to the increased variety of colors, color switching in TV pictures can be more natural, making the picture layer more distinct, and showing more details and being closer to the real effect. For liquid crystal display, because the screen itself doesn't have self-luminous property, improved color gamut is mainly achieved by color filters of three primary colors (red, green, blue); besides, it can also be achieved by adjusting the backlight. Presently, there are two primary methods for improving backlight purity: one is using blue LEDs plus red and green fluorescent materials as the backlight, and the other is using quantum dot backlight technology.

However, the biggest drawback of the above two methods for improving backlight purity is that the red, green and blue primary colors of the display are not pure. This is because the red, green, and blue primary colors are not purified during the process of improving color gamut, and turquoise light and yellow-orange light exist; therefore, by light with the red, green, and blue primary colors emitted is not pure. Besides, as the color gamut increases, light transmittance is decreased, making it difficult to achieve improvement of brightness while realizing improvement of color gamut.

Rhodamine-based materials can achieve good absorption of stray light other than RGB to improve the purity of the three primary colors. However, rhodamine dyes have a shoulder peak on the left side of the maximum absorption peak in the spectrum, causing absorption of partial blue light and partial green light, particularly the partial green light. In addition, a greater loss in transmittance is caused, mainly because of aggregation of rhodamine dyes, which leads to enhanced absorption of the shoulder peak. These factors will inhibit the application of rhodamine dyes in solid color display technologies.

Therefore, it is necessary to provide a new manufacturing method of a rhodamine dye oligomer to achieve the purification of color gamut while preventing excessive loss of brightness of display devices. The manufacturing method can also improve the thermal stability of rhodamine dyes, and meets the need of manufacturing process of liquid crystal display devices.

SUMMARY OF INVENTION

An object of the present disclosure is to provide a manufacturing method of a rhodamine dye oligomer, a solid color material and a liquid crystal display device by oligomerization of rhodamine dyes. It can achieve monodispersion of rhodamine dyes, and prevent the enhanced shoulder peak caused by aggregation of rhodamine dye molecules, thereby reducing absorption of blue light and green light caused by the shoulder peak, and improving the thermal stability of rhodamine dyes while achieving the purification of color gamut to meet the need of liquid crystal display devices.

To achieve the above object, an embodiment of the present disclosure provides a manufacturing method of a rhodamine dye oligomer. The method comprises following steps:

providing a rhodamine dye and an organic monomer;

dissolving the rhodamine dye and 4-hydroxystyrene in a first solvent to form a first mixed solution;

adding a first catalyst to the first mixed solution and reacting 24 hours to form a second mixed solution;

washing the second mixed solution with saturated saline and saturated aqueous sodium bicarbonate in sequence to form a third mixed solution;

washing the third mixed solution with a second solvent and obtaining rhodamine dye monomer through chromatographic column separation;

dissolving the rhodamine dye monomer and the organic monomer in a third solvent to form a fourth mixed solution;

adding a second catalyst to the fourth mixed solution and reacting 3 hours at 60° C. to form a fifth mixed solution;

washing the fifth mixed solution with a fourth solvent to obtain the rhodamine dye oligomer.

In an embodiment of the present disclosure, wherein in the step of providing the rhodamine dye and the organic monomer, a molecular structural formula of the rhodamine dye comprises one or more combinations selected from the group consisting of the following structural formulas:

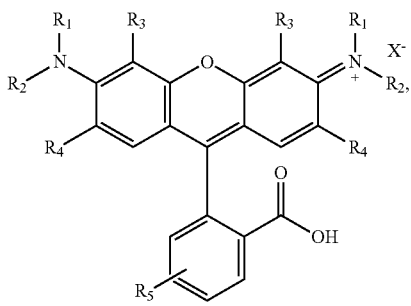

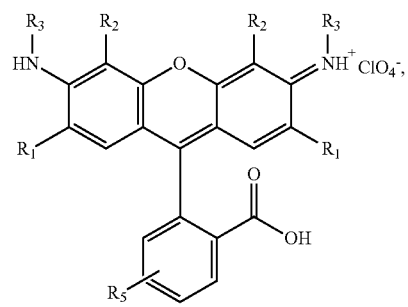

-continued

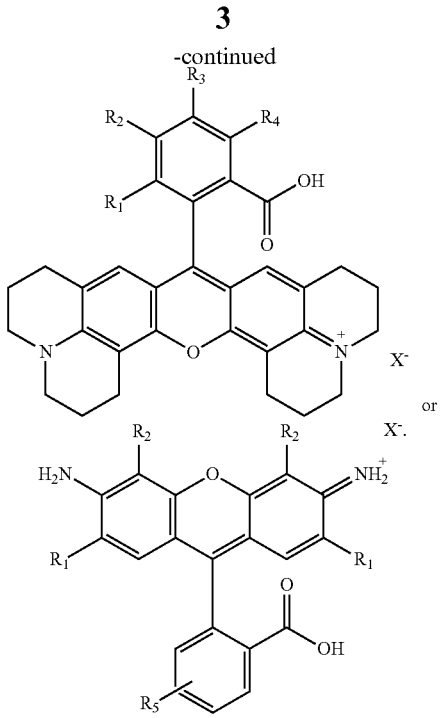

In an embodiment of the present disclosure, R1 to R5 are non-conjugated structures including linear alkanes, branched alkanes, or linear or branched alkanes having alkoxy groups; or R1 to R5 include ester-based chains or substituted alkane derivatives; and carbon chain lengths of R1 to R5 range from 1 to 30.

In an embodiment of the present disclosure, a structure of R1 to R5 is a conjugated structure which is connected by an alkoxy group and an ester group.

In an embodiment of the present disclosure, R1 to R5 are heterocyclic compounds, and the heterocyclic compounds comprise five-membered heterocyclic compounds, six-membered heterocyclic compounds, or benzoheterocyclic compounds; wherein the five-membered heterocyclic compounds comprise furan, thiophene, pyrrole, thiazole, or imidazole;

the six-membered heterocyclic compounds comprise pyridine, pyrazine, pyrimidine, or pyridazine;

the benzoheterocyclic compounds comprise indole, quinoline, pteridine, or acridine.

In an embodiment of the present disclosure, X— is F—, Cl—, Br—, CF3SO3-, CF2HSO3-, or CFH2SO3-; R1 to R4 comprise a halogen substituent, —F, —C, —Br, —I, an amino group, a carboxyl group, a hydroxy group, a sulphate group, an aldehyde group, an ester group, an acyl group, —COBr, a nitrile group, a nitro group, =NH, ≡N, a phenyl group, or a phenolic group.

In an embodiment of the present disclosure, the first catalyst comprises 4-dimethylaminopyridine and dicyclohexylcarbodiimide, and a molar ratio of 4-dimethylaminopyridine and dicyclohexylcarbodiimide is 1:3 to 1:1; a molar ratio of the rhodamine dye and 4-hydroxystyrene is 1:3 to 1:1.1; the first solvent comprises dichloromethane, the second solvent comprises hexane and dichloromethane, the third solvent comprises toluene, the fourth solvent is ethanol, and the second catalyst comprises azobisisobutyronitrile.

An embodiment of the present disclosure further provides a solid color material. The solid color material comprises: a resin, a photoinitiator, a solvent, an additive, and a rhodamine dye oligomer prepared by the above manufacturing method of the rhodamine dye oligomer.

In an embodiment of the present disclosure, the resin comprises transparent acrylic resins, and the acrylic resins include one or more combinations selected from the group consisting of dimethylaminoethyl methacrylate, butyl methacrylate, hydroxyethyl methacrylate, cyclohexyl methacrylate, and isooctyl methacrylate;

the photoinitiator includes one or more combinations selected from the group consisting of acetophenone derivatives: α, α-diethoxyacetophenone, 2-methyl-4'-(methylthio)-2-morpholino-propiophenol, and HMPP; the solvent includes one or more combinations selected from the group consisting of propylene glycol methyl ether acetate, propylene glycol monomethyl ether, and ethanolamine; the additive comprises a silane coupling agent.

An embodiment of the present disclosure further provides a liquid crystal display device, which comprises: a polarizer and a color filter substrate; wherein a solid color film is disposed on the polarizer, and/or a solid color film is disposed on the color filter substrate; wherein a material of the solid color film is the solid color material.

The present disclosure provides a manufacturing method of a rhodamine dye oligomer, a solid color material, and a liquid crystal display device. By oligomerization of rhodamine dyes, monodispersion of rhodamine dyes can be achieved, preventing enhanced shoulder peak caused by aggregation of rhodamine dye molecules, and reducing absorption of blue light and green light caused by the shoulder peak. Meanwhile, the purification of color gamut is achieved, and the thermal stability of rhodamine dyes is increased, thereby meeting the need of liquid crystal display devices. Moreover, applying the rhodamine dye oligomer to the solid color material and fabricating the solid color film for application in the liquid crystal display devices can prevent a great loss of brightness of display devices.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, and from these figures those skilled in the art can derive further figures without making any inventive effort.

DETAILED DESCRIPTION OF PREFERRED EMBODIMENTS

Figure 1:
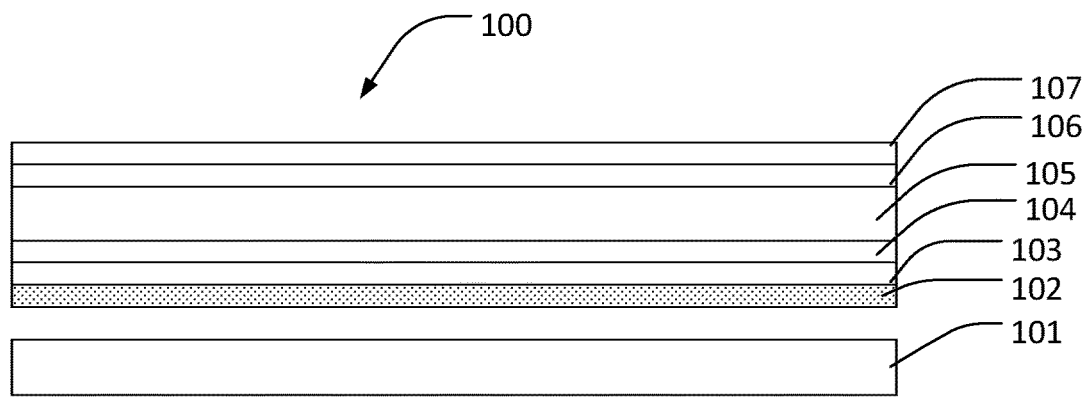
FIG. 1 is a schematic structural diagram of a liquid crystal display device according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. In the description of the present disclosure, it should be understood that terms such as "upper", "lower", "front", "rear", "left", "right", "inside", "outside", "side", as well as derivatives thereof should be construed to refer to the orientation as described or shown in the drawings under discussion. In addition, terms such as "first" and "second" are used herein for purposes of description. Thus, features limited by "first" and "second" are intended to indicate or imply including one or more than one these features.

Embodiments of the present disclosure will be described in detail herein with reference to the drawings. The present disclosure may be embodied in many different forms and the present disclosure is not to be construed as being limited to the specific embodiments set forth herein. The embodiments of the present disclosure are provided to explain the practical application of the present disclosure so that those skilled in the art can understand various embodiments of the present disclosure and various modifications suitable for the particular intended application.

An embodiment of the present disclosure provides a manufacturing method of a rhodamine dye oligomer. The method comprises the following S1 to S8 steps:

S1) Providing a rhodamine dye and an organic monomer;

a molecular structural formula of the rhodamine dye comprises one or more combinations selected from the group consisting of the following structural formulas:

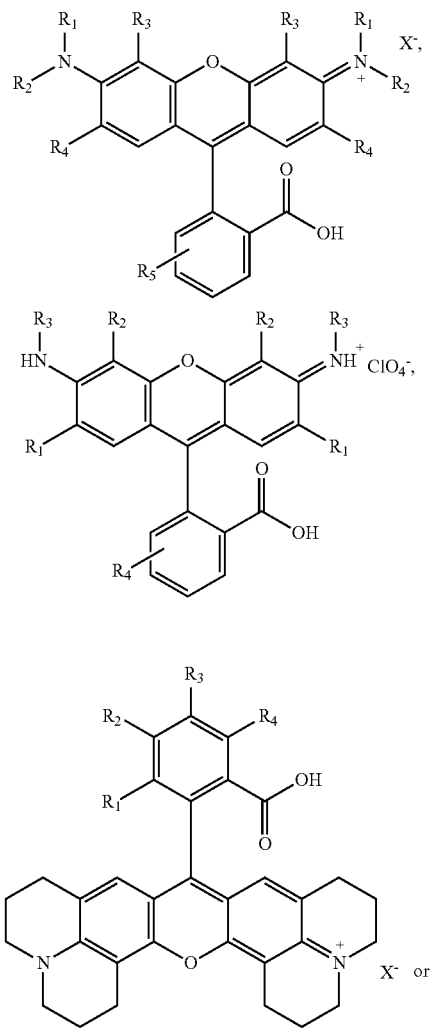

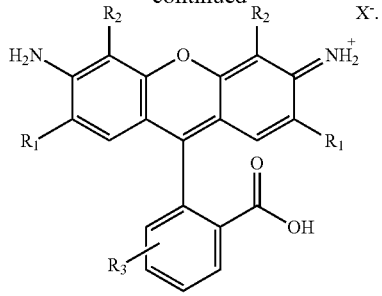

R1 to R5 are non-conjugated structures or conjugated structures connected by an alkoxy group and an ester group. Structures of R1 to R5 comprise linear alkanes, branched alkanes, or linear or branched alkanes having alkoxy groups. R1 to R5 comprise ester-based chains or substituted alkane derivatives.

Carbon chain lengths of R1 to R5 range from 1 to 30.

R1 to R5 can be heterocyclic compounds, and the heterocyclic compounds comprise five-membered heterocyclic compounds, six-membered heterocyclic compounds, or benzoheterocyclic compounds.

The five-membered heterocyclic compounds comprise furan, thiophene, pyrrole, thiazole, or imidazole; the six-membered heterocyclic compounds comprise pyridine, pyrazine, pyrimidine, or pyridazine; and the benzoheterocyclic compounds comprise indole, quinoline, pteridine, or acridine.

X— comprises F—, Cl—, Br—, CF3SO3-, CF2HSO3-, or CFH2SO3-; R1 to R4 comprise a halogen substituent, —F, —Cl, —Br, —I, an amino group, a carboxyl group, a hydroxy group, a sulphate group, an aldehyde group, an ester group, an acyl group, —COBr, a nitrile group, a nitro group, =NH, =N, a phenyl group, or a phenolic group.

S2) Dissolving the rhodamine dye and 4-hydroxystyrene in a first solvent to form a first mixed solution.

The first solvent comprises dichloromethane. A molar ratio of the rhodamine dye and 4-hydroxystyrene is 1:3 to 1:1.1

S3) Adding a first catalyst to the first mixed solution and reacting 24 hours to form a second mixed solution.

The first catalyst comprises 4-dimethylaminopyridine and dicyclohexylcarbodiimide, and a molar ratio of the 4-dimethylaminopyridine and the dicyclohexylcarbodiimide is 1:3 to 1:1.

S4) Washing the second mixed solution with saturated saline and saturated aqueous sodium bicarbonate in sequence to form a third mixed solution.

S5) Washing the third mixed solution with a second solvent and obtaining a rhodamine dye monomer through chromatographic column separation.

The second solvent comprises hexane and dichloromethane.

A chemical equation of synthesizing the rhodamine dye monomer is as follows:

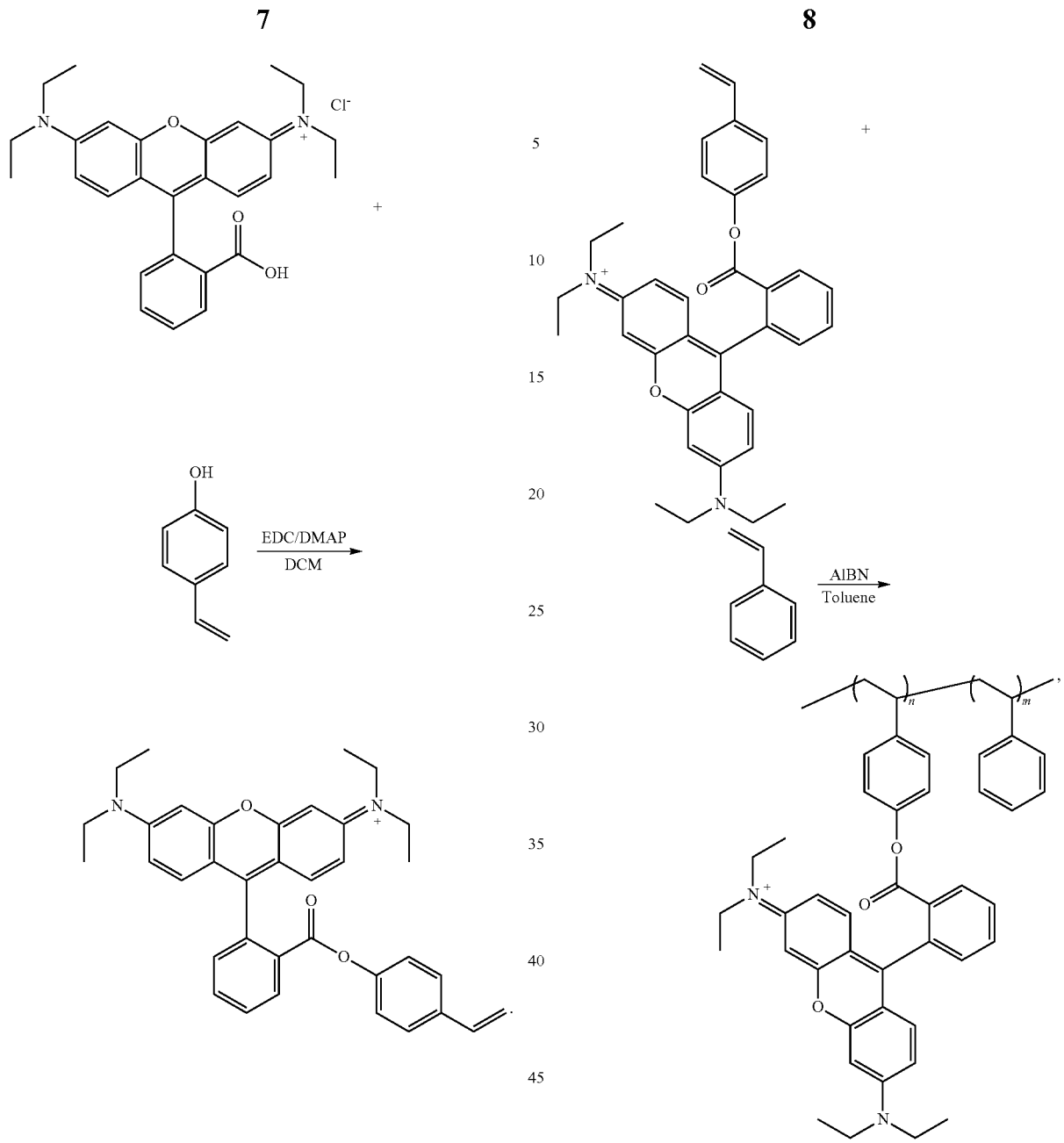

The above equation is to monomerize the rhodamine dye by modifying a carboxyl group in the bottom benzene ring of the rhodamine dye, or by modifying the structure of parent ring of rhodamine to monomerize the rhodamine dye.

S6) Dissolving the rhodamine dye monomer and the organic monomer in a third solvent to form a fourth mixed solution.

The third solvent comprises toluene.

S7) Adding a second catalyst to the fourth mixed solution and reacting 3 hours at 60° C. to form a fifth mixed solution.

The second catalyst comprises azobisisobutyronitrile.

S8) Washing the fifth mixed solution with a fourth solvent to obtain the rhodamine dye oligomer.

The fourth solvent is ethanol.

A specific synthesis of the rhodamine dye oligomer is as the following chemical equation:

wherein the organic monomer can be a structure containing a modifying group in the benzene ring of styrene other than styrene; or an organic monomer derivative, such as acrylic acid, acrylate, butadiene, or carbonate, wherein a ratio of m to n can be 1:1 to 1:10. A molecular weight of the formed oligomer is 2000 to 10000, wherein the molecular weight can be controlled by reaction time.

The present disclosure provides a manufacturing method of a rhodamine dye oligomer. By realizing monodispersion of rhodamine dye molecules to prevent the enhanced shoulder peak caused by aggregation of rhodamine dye molecules, absorption of blue light and green light caused by the shoulder peak is reduced, and purification of color gamut is realized.

An embodiment of the present disclosure further provides a solid color material. The solid color material comprises a resin, a photoinitiator, a solvent, an additive, and the rhodamine dye oligomer prepared by the manufacturing method of a rhodamine dye oligomer.

The resin is used to increase the molecular weight by crosslinking reaction, and the resin takes up an amount that is 12% to 20% by weight in the solid color material. The rhodamine dye oligomer is used to construct a crosslinked network structure and absorb stray light (yellow-orange light and blue-green light), and the rhodamine dye oligomer takes up an amount that is 5% to 15% by weight in the solid color material. The photoinitiator is activated by light (producing excitons), and the photoinitiator takes up an amount that is 0.8% to 1.5% by weight in the solid color material. The additive is used to make a substrate adhesion and acts as a surfactant, and the additive takes up an amount that is 2% to 2.4% by weight in the solid color material. The solvent is used for dissolving, dividing, and adjusting viscosities, and it takes up an amount that is 59% to 66% by weight in the solid color material.

The resin comprises transparent acrylic resins, and the acrylic resins include one or more combinations selected from the group consisting of dimethylaminoethyl methacrylate, butyl methacrylate, hydroxyethyl methacrylate, cyclohexyl methacrylate, and isooctyl methacrylate.

The photoinitiator includes one or more combinations selected from the group consisting of acetophenone derivatives: α, α-diethoxyacetophenone, 2-methyl-4'-(methylthio)-2-morpholino-propiophenol, and HMPP. The solvent includes one or more combinations selected from the group consisting of propylene glycol methyl ether acetate, propylene glycol monomethyl ether, and ethanolamine. The additive comprises a silane coupling agent.

As shown in FIG. 1, an embodiment of the present disclosure further provides a liquid crystal display device 100. The liquid crystal display device 100 comprises a backlight module 101, a lower polarizer 103, an array substrate 104, a liquid crystal layer 105, a color filter substrate 106, and an upper polarizer 107.

The lower polarizer 103 is disposed on the backlight module 101, and the array substrate 104 is disposed on one side of the lower polarizer 103 away from the backlight module 101. The liquid crystal layer 105 is disposed on one side of the array substrate 104 away from the lower polarizer 103, the color filter substrate 106 is disposed on one side of the liquid crystal layer 105 away from the array substrate 104, and the upper polarizer 107 is disposed on one side of the color filter substrate 106 away from the liquid crystal layer 105.

In an embodiment of the present disclosure, a solid color film 102 is disposed on one side of the lower polarizer 103 adjacent to the backlight module, a material of the solid color film 102 comprises the solid color material. The solid color film 102 can be obtained by coating, exposure to crosslink, and baking the solid color material.

The solid color film 102 can absorb stray light (yellow-orange light and turquoise light), thereby improving the color gamut.

Figure 2:
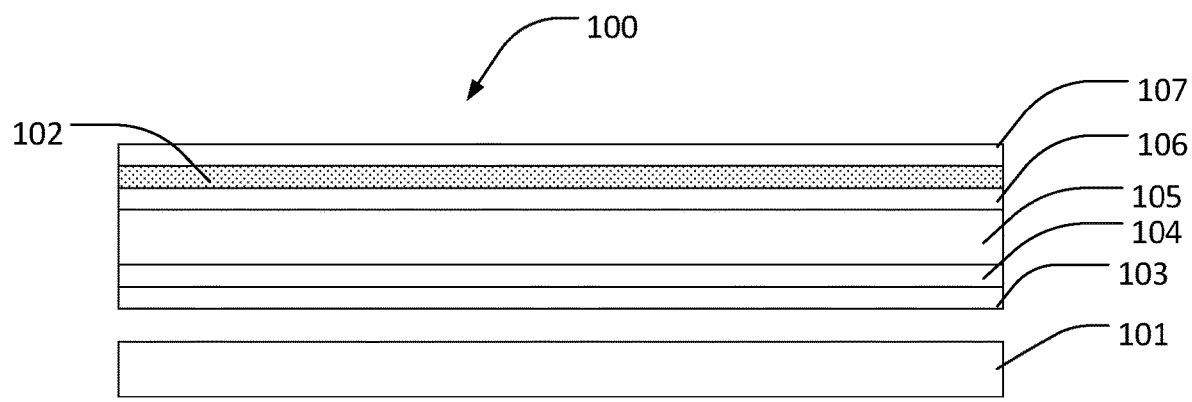
FIG. 2 is a schematic structural diagram of another liquid crystal display device according to an embodiment of the present disclosure.

As shown in FIG. 2, in another embodiment of the present disclosure, the solid color film 102 can also be disposed between the color filter substrate 106 and the liquid crystal layer 105.

The present disclosure further provides a liquid crystal device 100. By oligomerization of rhodamine dyes, monodispersion of rhodamine dyes can be achieved, preventing the enhanced shoulder peak caused by aggregation of rhodamine dye molecules, and reducing absorption of blue light and green light caused by the shoulder peak. Meanwhile, the purification of color gamut is achieved, and the thermal stability of rhodamine dyes is increased, thereby meeting the need of liquid crystal display devices. Moreover, applying the rhodamine dye oligomer to the solid color material and fabricating the solid color film for application in the liquid crystal display devices can prevent a great loss of brightness of display devices.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A manufacturing method of a rhodamine dye oligomer, comprising following steps:
   providing a rhodamine dye and an organic monomer;
   dissolving the rhodamine dye and 4-hydroxystyrene in a first solvent to form a first mixed solution;
   adding a first catalyst to the first mixed solution and reacting 24 hours to form a second mixed solution;
   washing the second mixed solution with saturated saline and saturated aqueous sodium bicarbonate in sequence to form a third mixed solution;
   washing the third mixed solution with a second solvent and obtaining a rhodamine dye monomer through chromatographic column separation;
   dissolving the rhodamine dye monomer and the organic monomer in a third solvent to form a fourth mixed solution;
   adding a second catalyst to the fourth mixed solution and reacting 3 hours at 60□ to form a fifth mixed solution; and
   washing the fifth mixed solution with a fourth solvent to obtain the rhodamine dye oligomer.

2. The manufacturing method of the rhodamine dye oligomer according to claim 1, wherein in the step of providing the rhodamine dye and the organic monomer, the molecular structural formula of the rhodamine dye is selected from the group consisting of the following structural formulas:

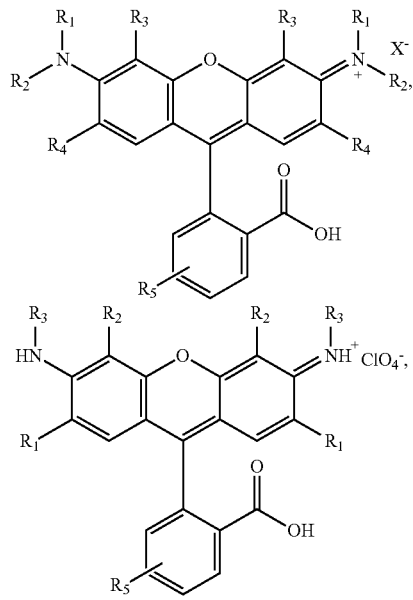

-continued

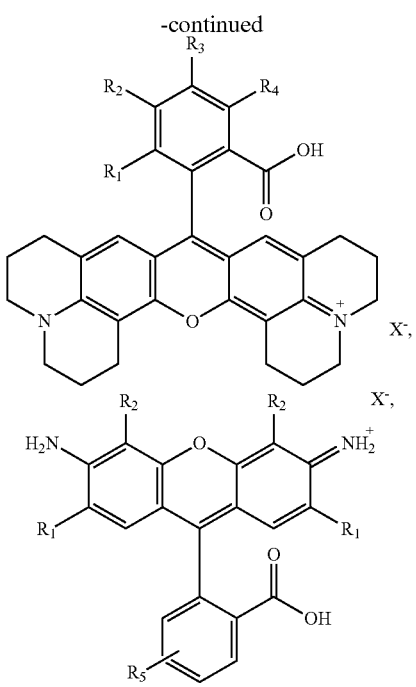

or a combination thereof, wherein R1 to R5 are independent groups connected to the main molecular structural formula of the rhodamine dye, and X— is an anion.

3. The manufacturing method of the rhodamine dye oligomer according to claim 2, wherein R1 to R5 are non-conjugated structures selected from linear alkanes, branched alkanes, or linear or branched alkanes substituted with alkoxy groups, or R1 to R5 are ester-based chains or substituted alkane derivatives; and carbon chain lengths of R1 to R5 range from 1 to 30.

4. The manufacturing method of the rhodamine dye oligomer according to claim 2, wherein a structure of R1 to R5 is a conjugated structure which is connected by an alkoxy group or an ester group.

5. The manufacturing method of the rhodamine dye oligomer according to claim 2, wherein R1 to R5 are heterocyclic compounds, and the heterocyclic compounds are five-membered heterocyclic compounds, six-membered heterocyclic compounds, or benzoheterocyclic compounds; wherein the five-membered heterocyclic compounds are furan, thiophene, pyrrole, thiazole, or imidazole;

the six-membered heterocyclic compounds are pyridine, pyrazine, pyrimidine, or pyridazine; and the benzoheterocyclic compounds are indole, quinoline, or acridine.

6. The manufacturing method of the rhodamine dye oligomer according to claim 2, wherein X— is F—, Cl—, Br—, CF3SO3-, CF2HSO3- or CFH2SO3-; R1 to R4 are independently —F, —Cl, —Br, —I, an amino group, a carboxyl group, a hydroxy group, a sulphate group, an aldehyde group, an ester group, an acyl group, —COBr, a nitrile group, a nitro group, a phenyl group, or a phenolic group.

7. The manufacturing method of the rhodamine dye oligomer according to claim 1, wherein the first catalyst comprises 4-dimethylaminopyridine and dicyclohexylcarbodiimide, and a molar ratio of 4-dimethylaminopyridine and dicyclohexylcarbodiimide is 1:3 to 1:1; a molar ratio of the rhodamine dye and 4-hydroxystyrene is 1:3 to 1:1.1; the first solvent comprises dichloromethane, the second solvent comprises hexane and dichloromethane, the third solvent comprises toluene, the fourth solvent is ethanol, and the second catalyst comprises azobisisobutyronitrile.

8. A solid color material, comprising: a resin, a photoinitiator, a solvent, an additive, and a rhodamine dye oligomer prepared by the manufacturing method of the rhodamine dye oligomer according to claim 2.

9. The solid color material according to claim 8, wherein the resin comprises transparent acrylic resins, and the acrylic resins are selected from the group consisting of dimethylaminoethyl methacrylate, butyl methacrylate, hydroxyethyl methacrylate, cyclohexyl methacrylate, isooctyl methacrylate, or a combination thereof;

the photoinitiator is selected from the group consisting of α, α-diethoxyacetophenone, 2-methyl-4'-(methylthio)-2-morpholino-propiophenone, 2-hydroxy-2-methyl-propiophenone, or a combination thereof;

the solvent is selected from the group consisting of propylene glycol methyl ether acetate, propylene glycol monomethyl ether, ethanolamine, or a combination thereof; and the additive is a silane coupling agent.

10. A liquid crystal display device, comprising: a polarizer and a color filter substrate; wherein a solid color film is disposed on the polarizer, and/or a solid color film is disposed on the color filter substrate; wherein a material of the solid color film is a solid color material; wherein the solid color material comprises a resin, a photoinitiator, a solvent, an additive, and a rhodamine dye oligomer prepared by the manufacturing method of the rhodamine dye oligomer according to claim 2.

11. The liquid crystal display device according to claim 10, wherein the resin comprises transparent acrylic resins, and the acrylic resins are selected from the group consisting of dimethylaminoethyl methacrylate, butyl methacrylate, hydroxyethyl methacrylate, cyclohexyl methacrylate, isooctyl methacrylate, or a combination thereof;

the photoinitiator is selected from the group consisting of α, α-diethoxyacetophenone, 2-methyl-4'-(methylthio)-2-morpholino-propiophenone, 2-hydroxy-2-methyl-propiophenone, or a combination thereof;

the solvent is selected from the group consisting of propylene glycol methyl ether acetate, propylene glycol monomethyl ether, ethanolamine, or a combination thereof; and the additive is a silane coupling agent.

* * * * *

UNITED STATES PATENT AND TRADEMARK OFFICE
CERTIFICATE OF CORRECTION

PATENT NO. : 10,988,619 B2
APPLICATION NO. : 16/616979
DATED : April 27, 2021
INVENTOR(S) : Bao Zha Page 1 of 1

It is certified that error appears in the above-identified patent and that said Letters Patent is hereby corrected as shown below:

On the Title Page

Column 1, item (30) should be added as follows:
Foreign Application Priority Data
July. 19, 2019 (CN)............................... 201910655745.4

Signed and Sealed this
Thirteenth Day of September, 2022

Katherine Kelly Vidal
*Director of the United States Patent and Trademark Office*